(12) United States Patent
Sato et al.

(10) Patent No.: US 6,926,445 B2
(45) Date of Patent: Aug. 9, 2005

(54) ROLLING BEARING UNIT WITH SENSOR

(75) Inventors: Yukio Sato, Kanagawa (JP); Shigeru Endo, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/237,710

(22) Filed: Sep. 10, 2002

(65) Prior Publication Data

US 2003/0048962 A1 Mar. 13, 2003

(30) Foreign Application Priority Data

Sep. 11, 2001 (JP) .................................... P. 2001-275294

(51) Int. Cl.⁷ .............................................. F16C 19/28
(52) U.S. Cl. ...................................................... 384/448
(58) Field of Search ................................ 384/448, 446, 384/544; 324/173, 174

(56) References Cited

U.S. PATENT DOCUMENTS

| | | |
|---|---|---|
| 5,140,849 A | 8/1992 | Fujita et al. |
| 5,585,577 A | 12/1996 | Lemoine et al. |
| 5,677,488 A | 10/1997 | Monahan et al. |
| 5,898,388 A | 4/1999 | Hofmann et al. |
| 5,969,518 A * | 10/1999 | Merklein et al. ............ 324/173 |
| 6,161,962 A | 12/2000 | French et al. |
| 6,202,491 B1 | 3/2001 | McCarty et al. |
| 6,484,582 B2 * | 11/2002 | Ehrfeld et al. .............. 384/448 |
| 2001/0039835 A1 | 11/2001 | Scholl et al. |

FOREIGN PATENT DOCUMENTS

| | | |
|---|---|---|
| CN | 1230245 A | 9/1999 |
| EP | 0 553 716 A1 | 8/1993 |
| EP | 0 976 638 A1 | 2/2000 |
| EP | 1 203 960 A2 | 5/2002 |

* cited by examiner

Primary Examiner—Lenard A. Footland
(74) Attorney, Agent, or Firm—Sughrue Mion, PLLC

(57) ABSTRACT

A four-row cylindrical roller bearing is incorporated into between the inner peripheral surface of a housing and the outer peripheral surface of a backup roller. A sensor unit 7 is held in a portion of a collar disposed in the axial-direction end portion of the four-row cylindrical roller bearing. The sensor unit comprises a detect part for detecting temperatures and vibrations and a transmitter device for transmitting signals, which are obtained after output signals taken out from the detect part are processed, as radio signals. On a portion of a hold cover which is a separate member from the collar, there is disposed a receive antenna which is part of a receiver apparatus for receiving the radio signals transmitted by the transmitter device.

41 Claims, 13 Drawing Sheets

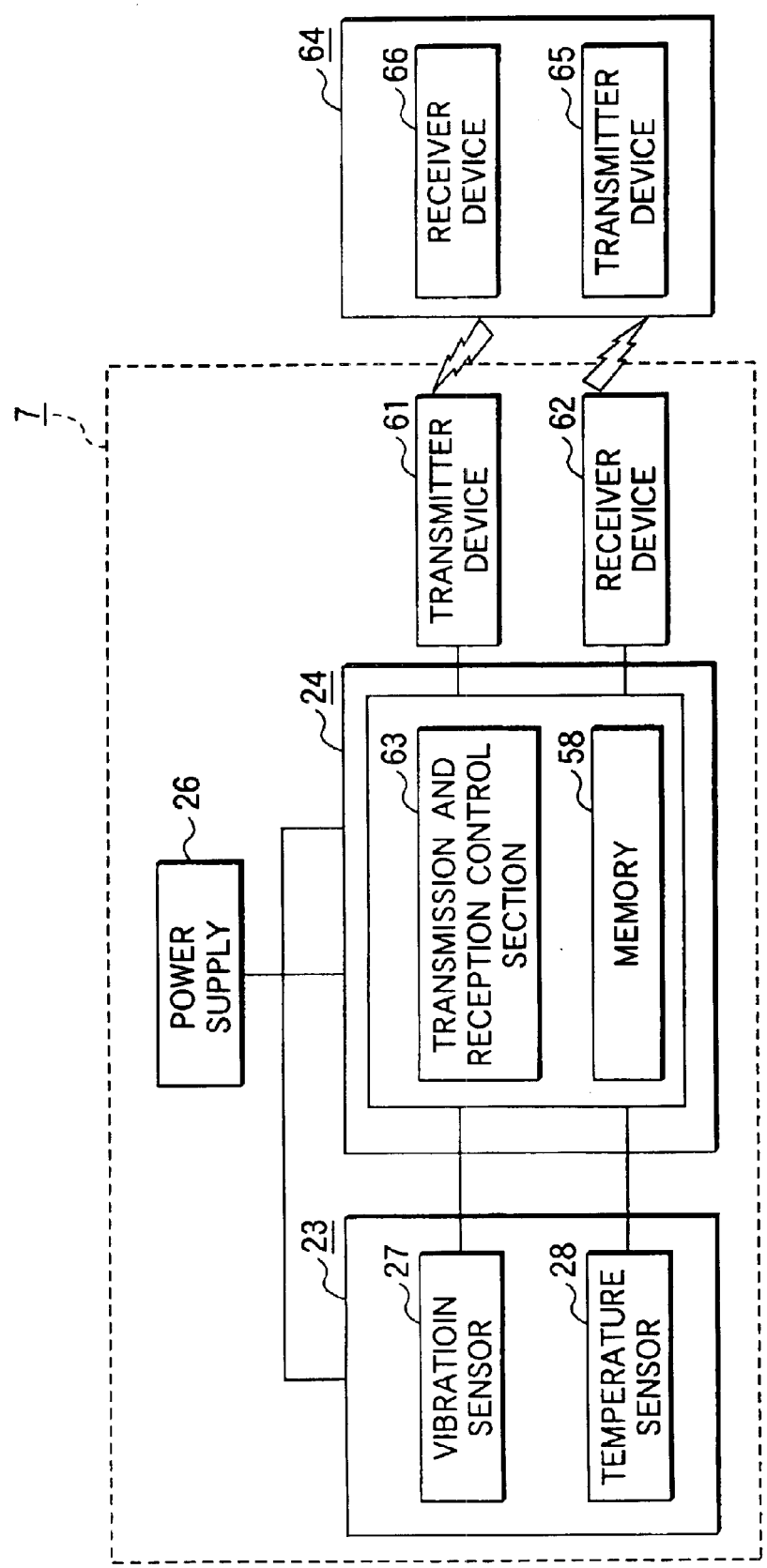

ROLLING BEARING UNIT WITH SENSOR

BACKGROUND OF THE INVENTION

The present invention relates to a rolling bearing unit with a sensor for use in the rotation support part of a machine which, when a large load is applied thereto to thereby damage the bearing thereof suddenly, requires a lot of labor and time to replace the damaged bearing with a new one, or for use in the rotation support part of a large-sized machine which includes a large number of rotation support parts and thus needs to control the starting times of use of the respective bearings, such as the rotation support part of a rolling roller used in a rolling mill for iron and steel or the rotation support part of various rollers used in a paper manufacturing machine.

For example, in the case of a rolling bearing to be used in the rotation support part of a machine which, in case where a large load is applied thereto to thereby damage its bearing unexpectedly, requires a great deal of labor and time to recover the damaged bearing such as a rolling bearing for supporting a roller neck for supporting the rolling roller of a rolling mill for iron and steel, it is necessary to prevent such unexpected damage of the bearing. For this purpose, generally, when such rolling bearing is used, not only the vibrations and temperatures of the rolling bearing in operation are measured but also whether an abnormal condition has occurred in the rolling bearing or not is checked in accordance with the thus measured vibrations and temperatures. For example, conventionally, in order to detect the occurrence of the abnormal condition in the rolling bearing, not only a vibration sensor consisting of accelerometer and a temperature sensor consisting of a thermocouple are mounted on part of a housing for storing the rolling bearing therein, but also these sensors are connected to an output apparatus disposed externally of the housing by wires such as a harness. And, when such rolling bearing unit with sensors is in use, the vibrations and temperatures of the rolling bearing are measured by the sensors indirectly through the housing. And, not only the vibrations and temperatures of the rolling bearing detected by the sensors are compared with their respective preset given threshold values for each passage of a given time in the above-mentioned external output apparatus, but also, in case where the detected vibrations exceed their threshold values, an effect telling the abnormal condition of the rolling bearing is output to the output part of the output apparatus to thereby notify an operation manager of the abnormal condition of the rolling bearing.

Also, in the case of a rolling bearing to be used in the rotation support parts of a large-sized machine which includes a large number of rotation support parts, the conditions of use of the respective rolling bearings thereof are different and, therefore, the lives of the respective rolling bearings vary from one another. Therefore, in case where the machine is used while replacing these rolling bearings, the starting times of use of the respective rolling bearings are different. Accordingly, in such large-sized machine, it is necessary to manage the starting times of use and using conditions of the respective rolling bearings. And, in order to manage such use starting times and using conditions, conventionally, when an operator assembles the respective rolling bearings onto the rotation support parts, the operator inputs the use starting times of the respective rolling bearings, the identification marks thereof, the assembling positions thereof, the numbers of housings and rollers to which the respective rolling bearings are assembled, and data on the accuracy of the respective rolling bearings into a computer, or writes them down in recording paper by hand. Since the lives of the respective rolling bearings can be predicted to a certain degree from the data on the use starting times of the respective rolling bearings, in case where such data are managed, it is possible to replace the respective rolling bearings before their lives are over.

In the above-structured conventional bearing unit with sensors, there are found the following problems to be solved.

(1) Since the sensors mounted on the housing are connected to the output apparatus by wires such as a harness, when replacing the rolling roller which needs to be replaced relatively frequently, the harness provides an obstacle, so that the operation to replace the rolling roller becomes troublesome.

(2) Because the vibrations and temperatures of the rolling bearings are measured indirectly through the housing, it is necessary to improve not only the measured values of the vibrations and temperatures but also the accuracy of the detection of the abnormal conditions of the rolling bearings based on such measured values.

(3) The operation for the operator to input the data on the use starting times of the respective rolling bearings or write down them into the recording paper is executed at a timing different from the assembling operation of the respective rolling bearings and at a place distant from a place where the assembling operation is carried out. This can raise a possibility that the data can be recorded wrong. However, it is troublesome to record the data while paying attention so as not to record the data wrong.

SUMMARY OF THE INVENTION

Accordingly, it is an object of the invention to provide a rolling bearing with a sensor which can solve the problems found in the conventional bearing unit with a sensor.

In attaining the above object, according to a first aspect of the present invention, there is provided a rolling bearing unit with a sensor, comprising: an outer ring and an inner ring, one of the outer and inner rings being a rotary ring and the other being a fixed ring, and the outer and inner rings being rotatable with respect to each other; a plurality of rolling elements rollably interposed between an outer raceway formed in an inner peripheral surface of the outer ring and an inner raceway formed in an outer peripheral surface of the inner ring; and, a sensor unit for detecting at least one of the temperatures and vibrations of a rolling bearing including the rolling elements, wherein the sensor unit is disposed on an axial-direction end portion of the fixed ring, or on a portion of an end portion member disposed so as to be superimposed on the axial-direction end face of the fixed ring, or on an axial-direction end portion of a retainer for holding at least part of the rolling elements.

According to a second aspect of the present invention, there is provided a rolling bearing unit with a sensor as set forth in the first aspect, wherein the sensor unit comprises: a detect part for detecting at least one of the temperatures and the vibrations; and a transmitter device for transmitting output signals taken out from the detect part or signals obtained after the output signals are processed, as radio signals; and, a portion of a member which is a separate member from a member supporting the sensor unit includes at least part of a receiver apparatus for receiving the radio signals transmitted by the transmitter device.

According to a third aspect of the present invention, there is provided a rolling bearing unit with a sensor as set forth in the first aspect, wherein, the sensor unit comprises: a detect part for detecting at least one of the temperatures and the vibrations; a memory for recording data representing output signals taken out from the detect part or signals obtained after the output signals are processed as well as the items to be managed with respect to the rolling bearing; and, a connector to be connected to an external input/output device, the external input/output device including an input for recording the data representing the items to be managed with respect to the rolling bearing into the memory and an output portion for outputting data taken out from the memory.

According to a fourth aspect of the present invention, there is provided a rolling bearing unit with a sensor as set forth in the first aspect, wherein, the sensor unit comprises: a detect part for detecting at least one of the temperatures and the vibrations; a memory for recording data representing output signals taken out from the detect part or signals obtained after process of the output signals as well as the items to be managed with respect to the rolling bearing; a first transmitter device for transmitting signals representing the data as radio signals; and, a first receiver device, and a portion of a member disposed separately from a member supporting the sensor unit includes at least part of a second receiver device for receiving the radio signals transmitted by the first transmitter device, and part of a second transmitter device for transmitting the data representing the items to be managed with respect to the rolling bearing as radio signals; and, the first receiver device receives the radio signals transmitted by the second transmitter device.

According to a fifth aspect of the present invention, there is provided a multi-row (including a double-row) rolling bearing unit, comprising the sensor unit as set forth in any one of the second to fourth aspects.

According to a sixth aspect of the present invention, there is provided a multi-row (including a double-row) rolling bearing unit for use in a roller neck supporting the rotation of a rolling roller disposed in a rolling mill in metal rolling facilities, comprising the sensor unit as set forth in any one of the second to fourth aspects.

According to a seventh aspect of the present invention, there is provided a multi-row (including a double-row) rolling bearing unit for use in a roller neck supporting the rotation of a rolling roller disposed in a rolling mill in paper manufacturing machine facilities, comprising the sensor unit as set forth in any one of the second to fourth aspects.

With use of the above-structured rolling bearing unit with a sensor according to the invention, the results, which are represented by the output signals taken out from the detect part or the signals obtained after the present output signals are processed, can be output to the output portion of an output device disposed on the receiver device side or to the output portion of the external input/output device, thereby allowing the operation manager to confirm easily whether any abnormal condition is present in the rolling bearing or not. Also, there is eliminated the need to guide out a harness or a cable, which is used to take out the above signals, from a member for fitting and fixing an outer ring or an inner ring, which makes it possible to facilitate the replacement of the member for fitting and fixing the outer ring or inner ring and the rolling bearing.

Also, since the sensor unit is disposed on a portion of the rolling bearing, the accuracy of detection of the temperatures and vibrations of the rolling bearing can be enhanced. The output device or external input/output device, which is used to notify the operation manager of presence or absence of an abnormal condition in the rolling bearing in accordance with the detect values relating to the above temperatures and vibrations, need not be connected to the sensor unit using wires such as a harness (in the case of the first and fourth aspects of the invention); or, the sensor unit may include a connector which is used to connect the sensor unit to the external input/output device (in the case of the third aspect of the invention). This can facilitate further the replacement of the member for fitting and fixing the outer ring or inner ring and the rolling bearing. Further, in the case of the rolling bearing units with a sensor as set forth in the second and fourth aspects of the invention, the data representing the items to be managed with respect to the rolling bearing units can be recorded into the memory using the input portion of the external input/output device connected to the sensor unit or an input portion disposed in the second transmitter device. Almost at the same time when the rolling bearing is assembled, an operator is able to record the above data in the vicinity of the place where the assembling operation is carried out, which not only can reduce mistakes in the data recording operation but also can facilitate the data recording operation.

DETAILED DESCRIPTION OF THE PREFERRED EMBODIMENTS

Figure 1:
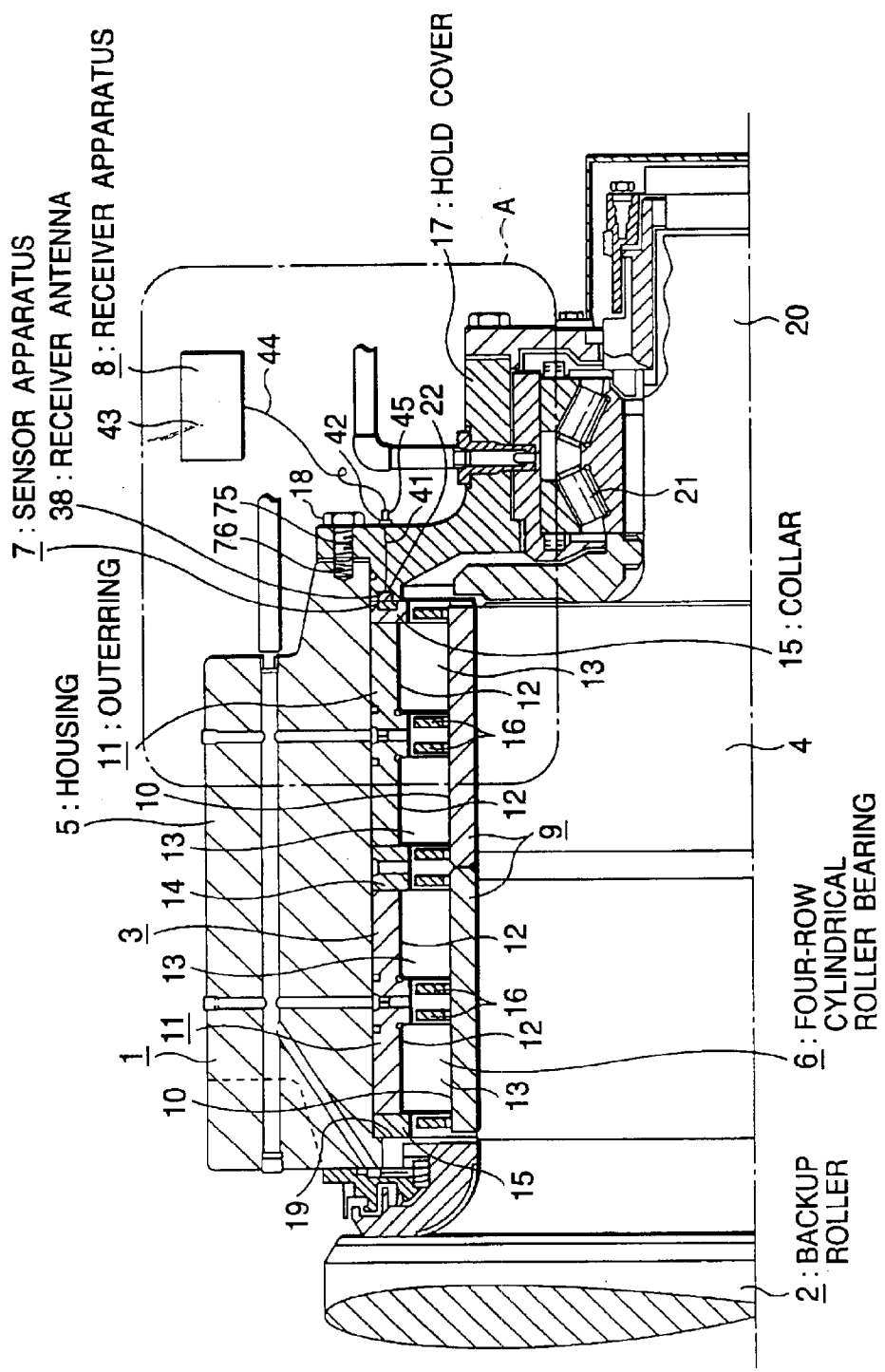
FIG. 1 is a section view of a half section of a first embodiment of a rolling bearing unit with a sensor according to the invention.
Figure 2:
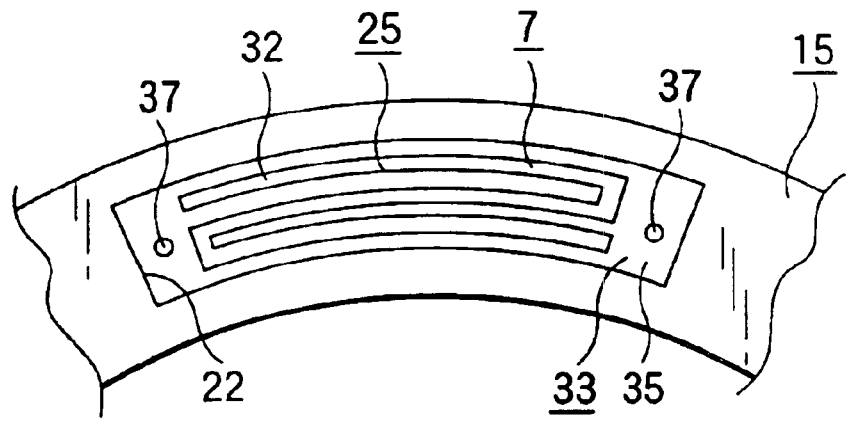
FIG. 2 is a partially enlarged view of a collar and a sensor unit employed in the first embodiment, when they are viewed from the right direction in FIG. 1.

FIGS. 1 to 5 show a first embodiment of a rolling bearing unit with a sensor according to the invention, corresponding to a second aspect of the invention. In this embodiment, a rolling bearing unit with a sensor is incorporated into rotation support portions formed in the axial-direction two end portions of a backup roller 2 disposed in a rolling mill 1 which is used to roll metal material such as iron and steel. That is, a roller neck 4, which is disposed in the central portion between the axial-direction two end faces of the backup roller 2, is rotatably supported inside a housing 4, which does not rotate even when it is in use, by a four-row cylindrical roller bearing 6. And, the four-row cylindrical roller bearing 6, a sensor unit 7 and a receiver apparatus 8 cooperate together in constituting the present bearing unit 3 with a sensor. Of these three elements, the four-row cylindrical roller bearing 6 comprises a plurality of cylindrical rollers 13, 13 respectively between inner raceways 10, 10 formed in the outer peripheral surfaces of a pair of inner rings 9, 9 fitted with and fixed to the outer surface of the roller neck 4 and outer raceways 12, 12 formed in the inner peripheral surfaces of a pair of outer rings 11, 11 fitted with and fixed to the inner surface of the housing 5.

Also, there is interposed an intermediate seat 14 between the pair of outer rings 11, 11 and, at the same time, on the axial-direction two sides of the mutually superimposed two outer rings 11, 11 and intermediate seat 14, there are disposed a pair of collars 15, 15. Also, the respective cylindrical rollers 13, 13 are held by retainers 16, 16. Further, to the axial-direction outer end portion of the housing 5, there is fixed a hold cover 17 in such a manner that the near-to-outside-diameter portion of the axial-direction inner surface (in FIG. 1, the left side surface) of the hold cover 17 is abutted against the axial-direction outer end face of the housing 5. To attain this, while the near-to-outside-diameter portion of the axial-direction inner surface of the hold cover 17 is abutted against the axial-direction outer end face of the housing 5, a plurality of bolts 18 are inserted through a through hole 75 formed in part of the hold cover 17 and the leading end portions of the screwed portions of the respective bolts 18 are threadedly engaged with and tightly fastened to a screw hole 76 formed in the axial-direction outer end face of the housing 5. In this state, the pairs of outer rings 11, 11, the pairs of collars 15, 15 and their respective intermediate seats 14 are held by and between the diameter-direction middle portion of the axial-direction inner surface of the hold cover 17 and a stepped surface 19 formed in the inner peripheral surface of the axial-direction inner end portion (in FIG. 1, the left end portion) of the housing 5. Also, in the present embodiment, not only there is formed a cylindrical portion 20 having a small diameter in the axial-direction central portion of the axial-direction two end faces of the roller neck 4, but also there is incorporated a four-row conical roller bearing 21 between the outer peripheral surface of the cylindrical portion 20 and the inner peripheral surface of the hold cover 17.

Figure 3:
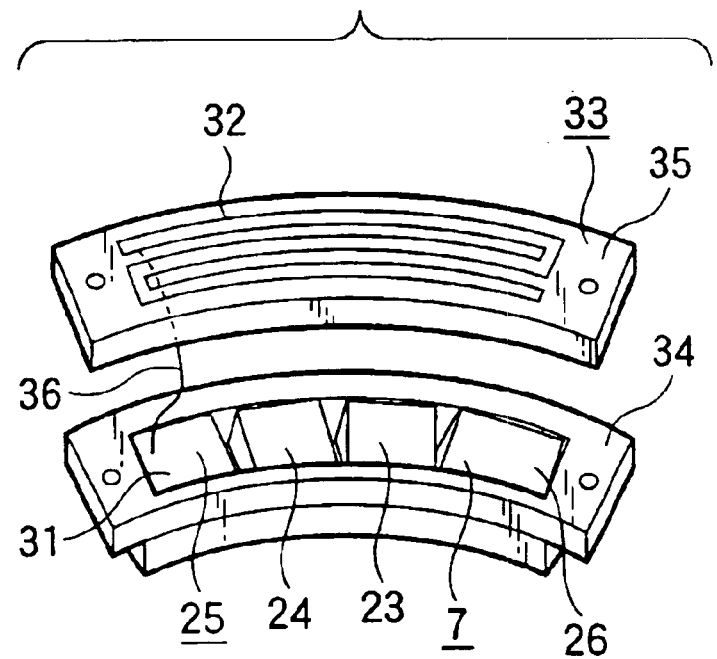
FIG. 3 is a substantially exploded perspective view of the sensor unit and a storage case.
Figure 4:
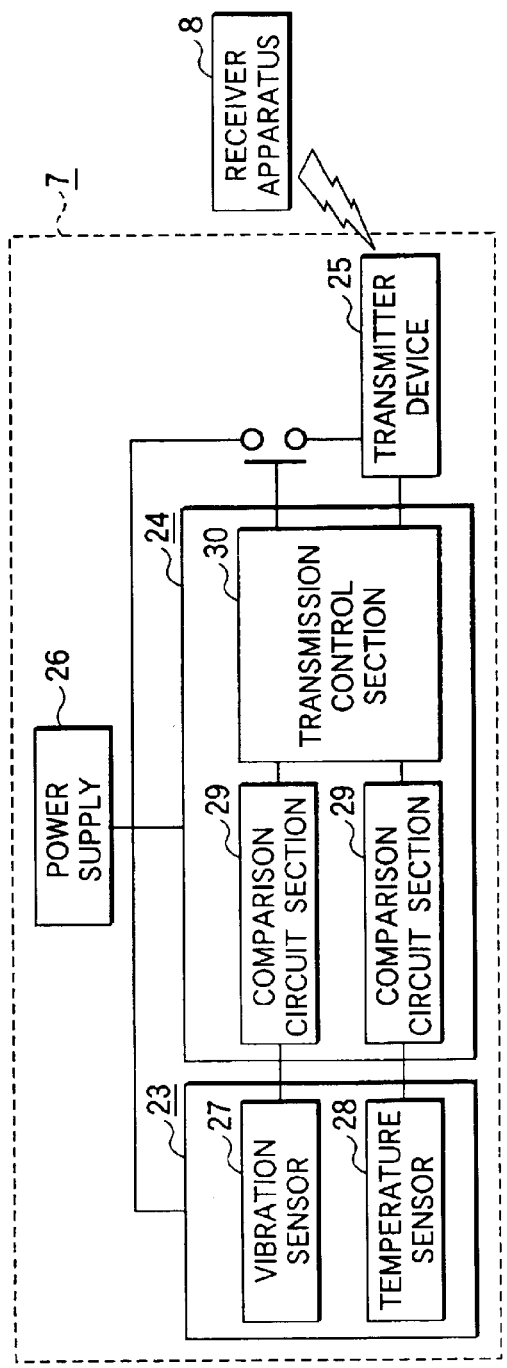
FIG. 4 is a block diagram of the sensor unit used in the first embodiment.

And, the sensor unit 7 is held on the axial-direction outer end portion (in FIG. 1, the right end portion) of one (in FIG. 1, the right one) of the pair of collars 15, 15. To attain this, in the present embodiment, there is formed an arc-shaped groove portion 22 in a circumferential-direction portion of the axial-direction outer end face of one collar 15. And, the arc-shaped sensor unit 7 is held inside the groove portion 22. The sensor unit 7, as shown in FIGS. 3 and 4, comprises a detect part 23, a control part 24, a transmitter device 25, and a power supply 26 for operating these respective parts 23 to 25. Also, the detect part 23 includes a vibration sensor (acceleration sensor) 27 and a temperature sensor 28. Further, the control part 24 comprises a pair of comparison circuit sections 29, 29 which, whenever a given time passes after the power supply 26 is turned on, compare detect values represented by output signals taken out from the sensors 27 and 28 with the irrespective preset given threshold values, and a signal transmission control section 30 having a function not only to synthesize signals representing the comparison results using the two comparison circuit sections 29, 29 but also to allow the transmitter device 25 to transmit the synthesized signals as radio signals (radio waves). And, the transmitter device 25 includes a main body portion 31 and a transmission antenna portion 32 connected to the main body portion 31.

And, in the present embodiment, the power supply 26, detect part 23, control part 24 and the main body portion 31 of the transmitter device 25, which respectively constitute the sensor unit 7, are supported inside a storage part 34 constituting a storage case 33 made of synthetic resin; and, the transmission antenna portion 32 is disposed on the side surface of a flat-plate-shaped cover part 35 which constitutes the storage case 33. The transmission antenna portion 32 is formed of a thin conductor into a wave-like shape and is printed on the side surface of the cover part 35. And, the end portion of the transmission antenna portion 32 and the main body portion 31 of the transmission device 25 are connected together by a conductor 36. The cover part 35 is connected by screws 37, 37 to the storage part 34 in such a manner that the storage part supports the respective parts 23, 24 and 31 of the sensor unit 7. And, while the sensor unit 7 is supported on the storage case 33 in this manner, the sensor unit 7 is held in the groove portion 22 formed in one collar 15. In the present embodiment, one collar 15 corresponds to such an end portion member as set forth in the second aspect of the invention.

Figure 5:
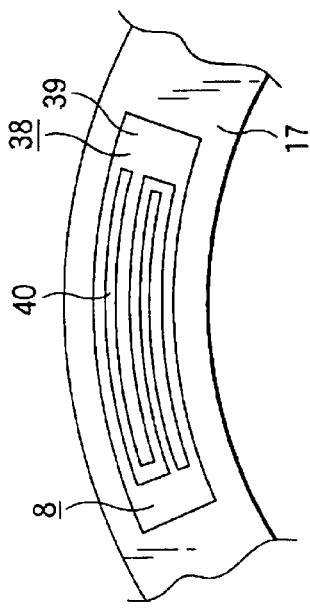
FIG. 5 is a partially enlarged view of a hold cover and a receive antenna employed in the first embodiment, when they are viewed from the left direction in FIG. 1.

On the other hand, in such a position of the diameter-direction middle portion of the axial-direction inner surface of the hold cover 17 that is substantially opposed to the sensor unit 7 held on the above-mentioned one collar 15, there is disposed a receive antenna 38 which constitutes the receiver apparatus 8. This receive antenna 38, as shown in FIG. 5, is composed of a thin conductor 40 which is printed on an arc-shaped substrate 39. And, a cable 41 having one end connected to the end portion of the thin conductor 40 is inserted into the hold cover 17 in the axial direction thereof, while the other end of the cable 40 is connected a connector 42 which is disposed on the axial-direction outer surface (in FIG. 1, the right side surface) of the hold cover 17. And, to the connector 42, there is connected a plug 45 which is disposed on the other end portion of a cable 44 with one end portion thereof connected to a main body portion 43 forming the receiver apparatus 8. The receiver apparatus 8 is able to receive radio signals transmitted from the sensor unit 7 through the receive antenna 38. And, by the side of the main body portion 43 forming the receiver apparatus 8, there is disposed an output device (not shown). This output device, when the receiver apparatus 8 receives the radio signals, outputs the comparison results of the comparison circuit sections 29, 29 represented by the present radio signals to the output portion of the output device such as the display portion thereof.

According to the above structured rolling bearing unit with a sensor of the invention, in case where an operation manager monitors the results that are output to the output portion of the output device, the operation manager is able to confirm presence or absence of an abnormal condition in the four-row cylindrical roller bearing 6. Also, in the present embodiment, the control part 24 of the sensor unit 7 compares the detect value detected by the detect part 24 with its given threshold value whenever a given time passes, and allows the transmitter device 25 to transmit the compared result as a radio signal. Therefore, when compared with a structure in which the control part is always performing a comparing operation and transmits the compared results as radio signals, the power consumption of the power supply 26 disposed in the sensor unit 7 can be reduced.

Further, in the present embodiment, in order to transmit the signals processed by the comparison circuit sections 29, 29 to the above-mentioned output device, the end portion of the cable 44 guided from the main body portion 43 of the receiver apparatus 8 is connected to the connector 42 which is disposed in a portion of the hold cover 17. Due to this, in the present embodiment, a harness or a cable for taking out the present signals need not be guided from a portion of the housing 5. Therefore, when replacing the backup roller 2 and four-row cylindrical roller bearing 6, simply by removing the hold cover 17 from the housing 5, it is possible to prevent the cable 44 from interfering with the replacement operation of the backup roller 2 and four-row cylindrical roller bearing 6, which can facilitate the present replacement operation. Also, in the present embodiment, since the plug 45 disposed on the end portion of the cable 44 is connected to the connector 42 which is disposed on the hold cover 17, simply by removing the plug 45 from the connector 42, it is possible to prevent the cable 44 from interfering with the replacement operation. This makes it possible to carry out the replacement operation with better efficiency.

Further, in the present embodiment, because the sensor unit 7 including the detect part 23 is held on a portion of one of the collars 15 forming the four-row cylindrical roller bearing 6, when compared with a structure in which a temperature sensor and a vibration sensor are disposed on a portion of the housing 5, the detect values themselves of the temperatures and vibrations of the four-row cylindrical roller bearing 6 as well as the detection of the abnormal condition of the four-row cylindrical roller bearing 6 based on these detect values can be enhanced in accuracy. And, according to the present embodiment, on the sensor unit 7, there is disposed the transmitter device 25 which is able to transmit radio signals representing the comparison results between the above-mentioned detect values of the temperatures and vibrations and their respective given threshold values. At the same time, in a portion of the hold cover 17, there is disposed the receiver apparatus 8 which is used to receive the present radio signals. This can eliminate the need to connect the output device for notifying the operation manager of presence or absence of the abnormal condition in the four-row cylindrical roller bearing 6 to the sensor unit 7 by wires such as a harness. Thanks to this, the replacement operation of the backup roller 2 and four-row cylindrical roller bearing 6 can be executed more easily.

Figure 6:
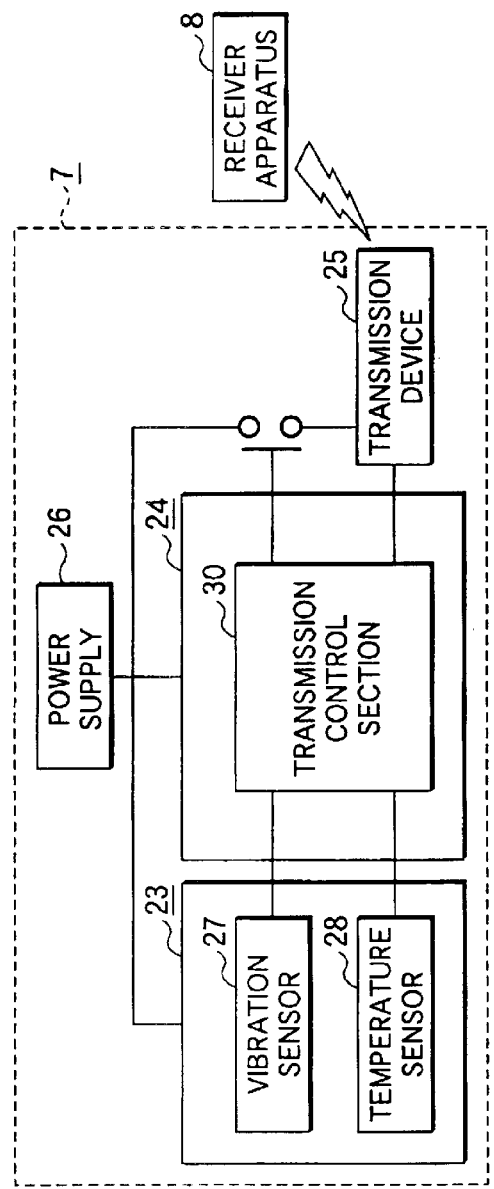
FIG. 6 is a block diagram of another embodiment of the sensor unit.

By the way, in the present embodiment, the sensor unit 7 is supported on a portion of one of the collars 15 while it is supported on the storage case 33. However, alternatively, the storage case 33 can be omitted and the respective parts 23–26 forming the sensor unit 7 can be supported directly on a portion of the above-mentioned one collar 15. Also, in the present embodiment, the sensor unit 7 is held in the groove portion 22 formed in a portion of the above-mentioned one collar 15 in the circumferential direction thereof. However, alternatively, in a portion of the above-mentioned one collar 15 in the circumferential direction thereof, there can be formed a through hole which penetrates through the present collar 15 in the axial direction thereof, and the sensor unit 7 can be held in this through hole. Also, differently from the present embodiment, as shown in FIG. 6, the comparison circuit sections 29 (see FIG. 4) can be omitted from the control part 24 forming the sensor unit 7, and the control part 24 can be composed of only the transmission control section 30. In this structure, the control part 24, whenever a given time passes, allows the transmitter device 25 to transmit, as radio signals, signals representing the detect values of the temperatures and vibrations of the four-row cylindrical roller bearing 6 detected by the detect part 23. Therefore, in this case, the detect values of the temperatures and vibrations, as they are (that is, as they are not compared with their respective given threshold values), are output to the output portion of the output device disposed on the receiver apparatus 8 side. Accordingly, alternatively, in the output device, there can be disposed a comparison circuit section for comparing the detect values with the given threshold values, and the comparison results obtained by this comparison circuit section can be output to the above-mentioned output portion.

Figure 7:
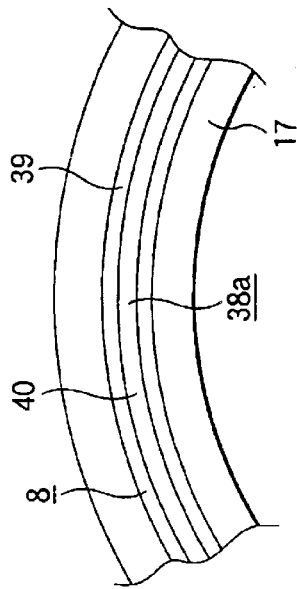
FIG. 7 is a partially enlarged view of a hold cover and a receive antenna employed in a second embodiment of a rolling bearing unit with a sensor according to the invention.

Next, FIG. 7 shows a second embodiment of a rolling bearing unit with a sensor according to the invention, also corresponding to a second aspect of the invention. In the present embodiment, in the diameter-direction middle portion of the axial-direction inner surface (in FIG. 7, the front side surface) of the hold cover 17, there is disposed a substantially-circular-ring-shaped receiver antenna 38$a$ in such a manner that it is concentric with the hold cover 17. And, a portion of the receiver antenna 38$a$ in the circumferential direction thereof is disposed opposed to the sensor unit 7 (see FIGS. 1 and 2) which is disposed on the above-mentioned one collar 15. In the thus structured present embodiment, when it is in use, even in case the above-mentioned one collar 15 is rotated with respect to the hold cover 17, the sensor unit 7 disposed on the above one collar 15 can be disposed opposed to a portion of the receive antenna 38$a$, so that radio signals transmitted from the sensor unit 7 can be received well by the receiver apparatus 8.

The remaining structures and operations of the present embodiment are similar to the previously described first embodiment and thus the illustration and description thereof are omitted here.

Figure 8:
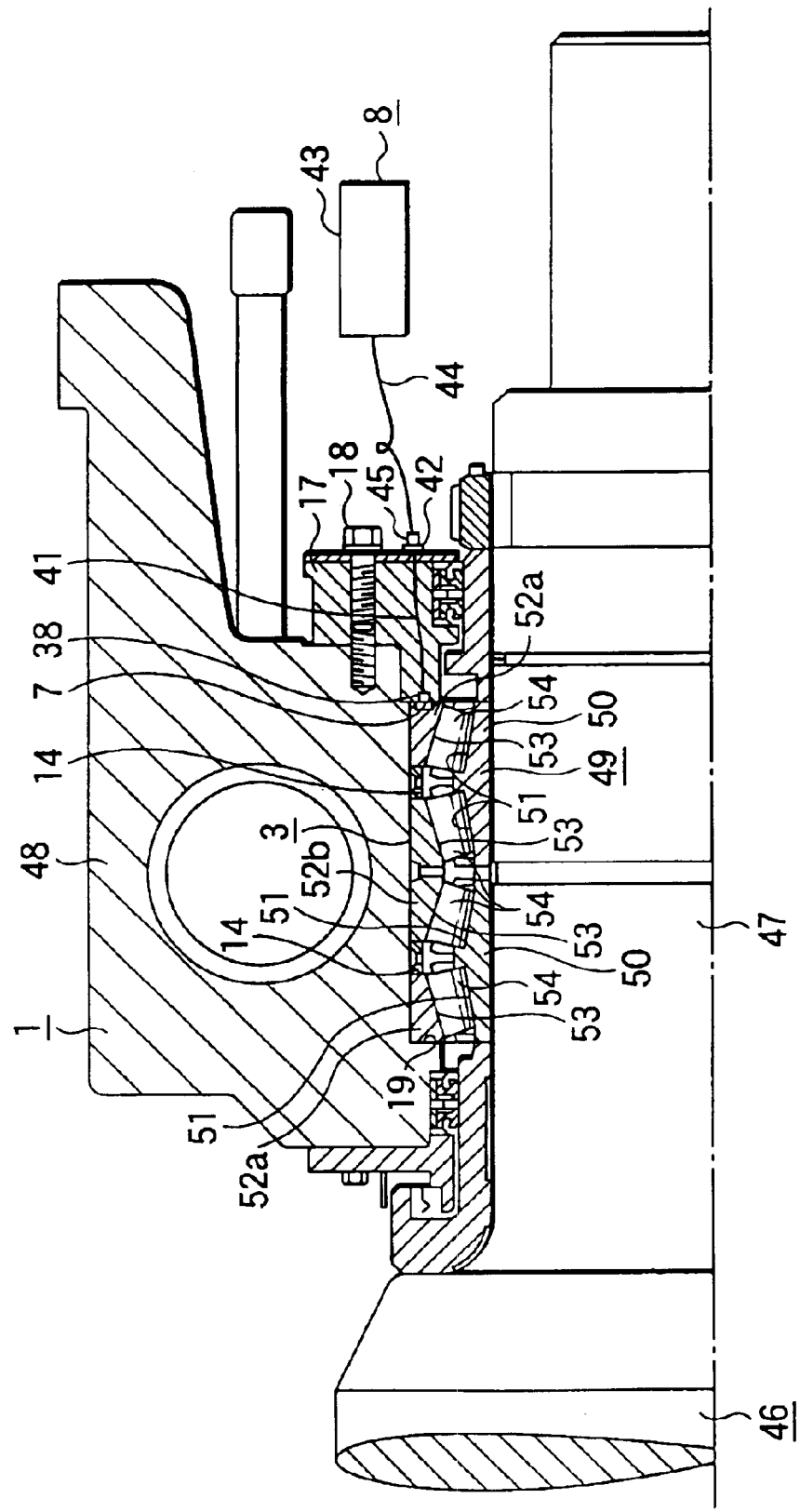
FIG. 8 is a section view of a half section of a third embodiment of a rolling bearing unit with a sensor according to the invention.

Next, FIG. 8 shows a third embodiment of a rolling bearing unit with a sensor according to the invention, also corresponding to the second aspect of the invention. In the case of a rolling bearing unit 3 with a sensor according to the present embodiment, the roller neck 47 of a work roller 46 is supported so as to be rotatable with respect to a housing 48. Also, the present rolling bearing unit with a sensor 3 includes a four-row conical roller bearing 49. This four-row conical roller bearing 49 comprises a plurality of cylindrical rollers 54, 54 interposed between inner raceways 51, 51 formed in the outer peripheral surfaces of a pair of inner rings 50, 50 fitted with and fixed to the outer surface of the roller neck 47 of the work roller 46 and a plurality of outer raceways 53, 53 formed in the inner peripheral surfaces of a pair of three outer rings 52*a*, 52*b* fitted with and fixed to the inner surface of the housing 5. Also, not only a hold cover 17 is fixed to the axial-direction outer end portion (in FIG. 8, the right end portion) of the housing 5 but also, between the axial-direction inner surface (in FIG. 8, the right side surface) of the hold cover 17 and a stepped surface 19 formed in the inner peripheral surface of the axial-direction inner end portion (in FIG. 8, the left end portion) of the housing 5, there are held the respective outer rings 52*a*, 52*b* and a pair of intermediate seats 14, 14 which are interposed between these outer rings 52*a*, 52*b*. Of the three outer rings 52*a*, 52*b*, in the axial-direction outer end portion (in FIG. 8, the right end portion) of the outer ring 52*a* that is situated on the axial-direction outer end side (in FIG. 8, the right end side), there is disposed a sensor unit 7. Also, in such a position of the axial-direction inner surface of the hold cover 17 that is disposed substantially opposed to the sensor unit 7, there is disposed a receive antenna 38 which forms a receiver apparatus 8.

In the thus structured third embodiment, since the sensor unit 7 is disposed directly on a portion of the outer ring 52*a* that is situated on the axial-direction outer end side, the accuracy of detection of the abnormal condition of the four-row conical roller bearing 49 can be enhanced further. The remaining structures and operations of the present embodiment are similar to the first embodiment previously discussed with reference to FIGS. 1 to 5 and thus the illustration and description thereof are omitted here.

Figure 9:
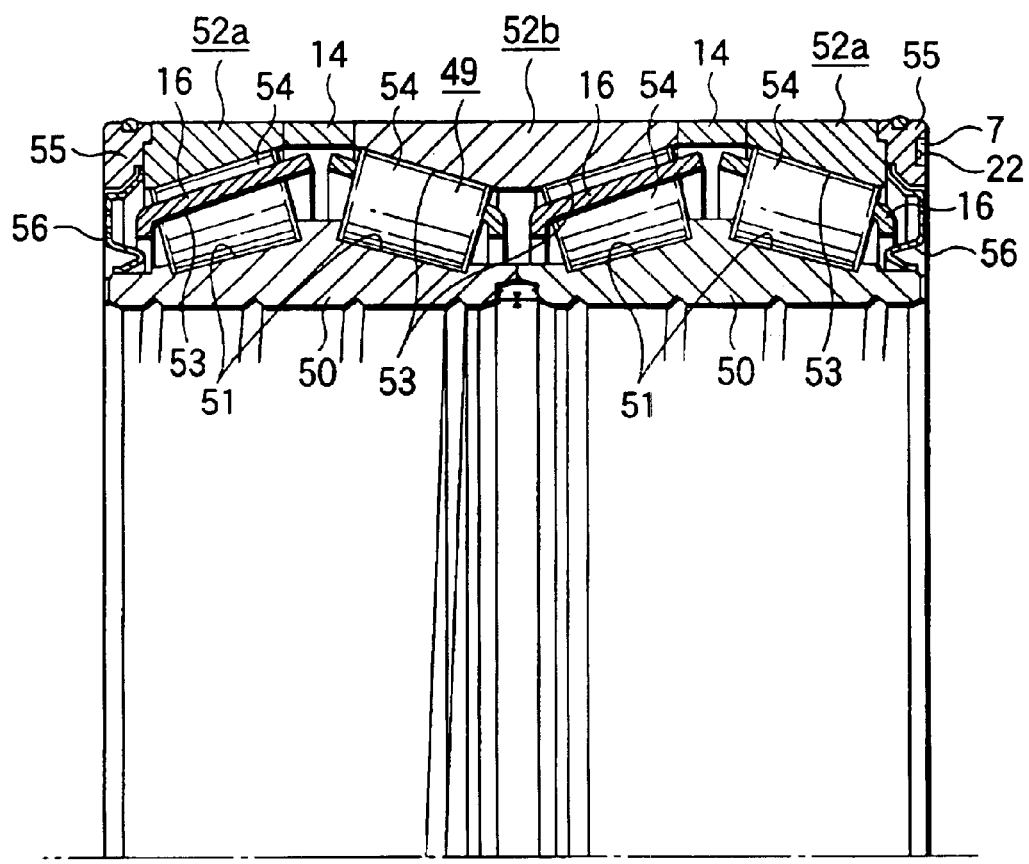
FIG. 9 is a section view of a half section of only a four-row conical roller bearing used in a fourth embodiment of a rolling bearing unit with a sensor according to the invention.

Next, FIG. 9 shows a fourth embodiment of a rolling bearing unit with a sensor according to the invention, also corresponding to the second aspect of the invention. In the present embodiment, similarly to the third embodiment shown in FIG. 8, a rolling bearing unit with a sensor includes a four-row conical roller bearing 49. Especially, in the present embodiment, on the axial-direction two end portions of the four-row conical roller bearing 49, there are disposed a pair of circular-ring-shaped seal holders 55, 55 in such a manner that the two seal holders 55, 55 hold a plurality of outer rings 52*a*, 52*b* and intermediate seats 14, 14 from the axial-direction two sides thereof between them. And, the outer peripheral edge portions of seal rings 56, 56 are respectively secured to the inner peripheral surfaces of the seal holders 55, 55, while the inner peripheral edge portions of the seal rings 56, 56 are respectively slidingly contacted with the entire peripheries of the axial-direction end portions of the outer peripheral surfaces of a pair of inner rings 50, 50. And, the two end portions of the internal space of the four-row conical roller bearing 49 are closed by the respective seal rings 56, 56. Especially, in the present embodiment, of the pair of seal holders 55, 55, one (in FIG. 9, the right) seal holder 55 includes a groove portion 22 formed in the axial-direction outer surface (in FIG. 9, the right side surface) thereof, and a sensor unit 7 is held in this groove portion 22. In the case of the present embodiment, the above-mentioned one seal holder 55 corresponds to an end portion member as set forth in the second aspect of the invention.

The remaining structures and operations of the present embodiment are similar to the third embodiment previously described with respect to FIG. 8 and thus the duplicate illustration and description thereof are omitted here.

Figure 10:
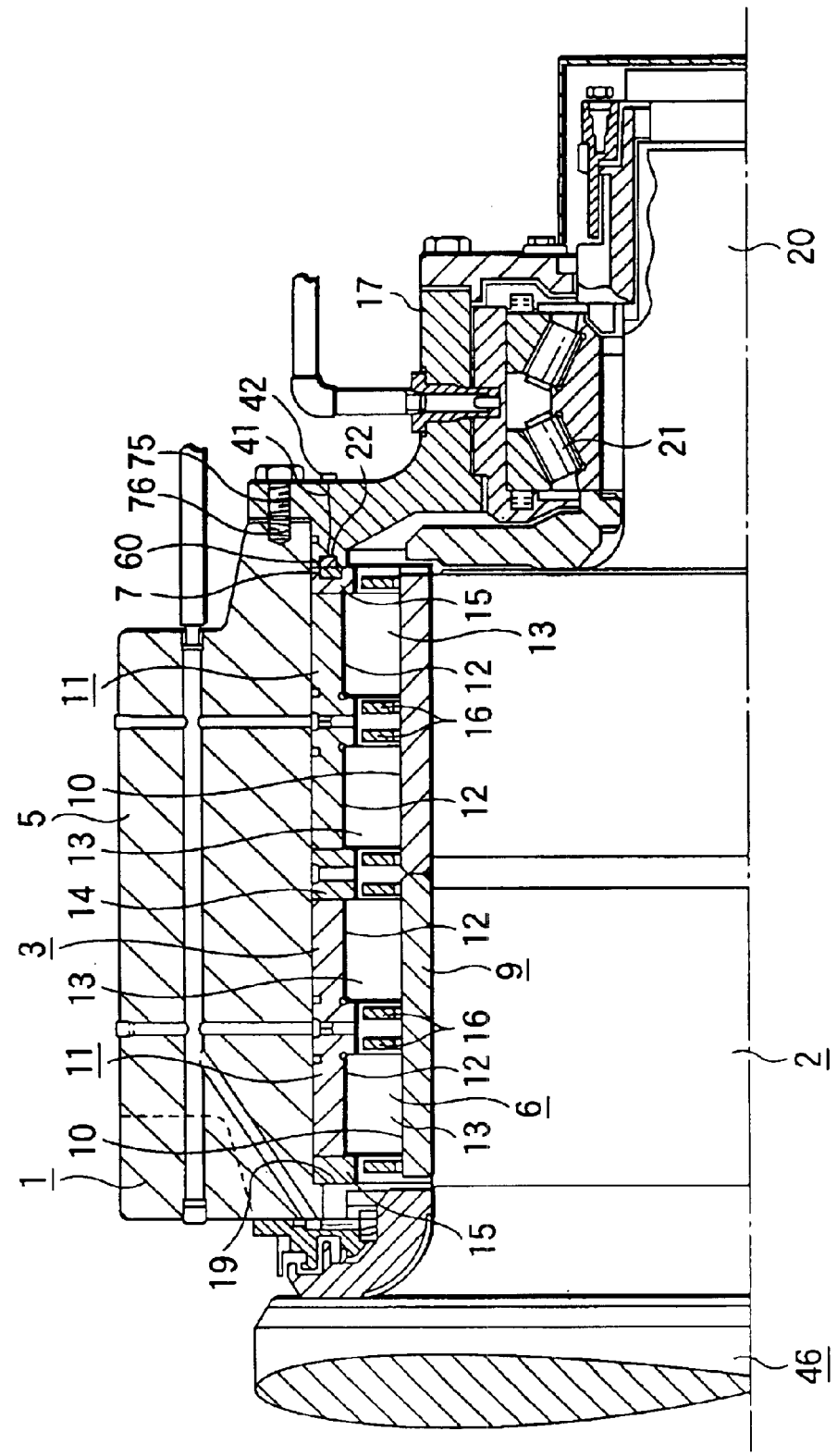
FIG. 10 is a section view of a half section of a fifth embodiment of a rolling bearing unit with a sensor according to the invention.
Figure 11:
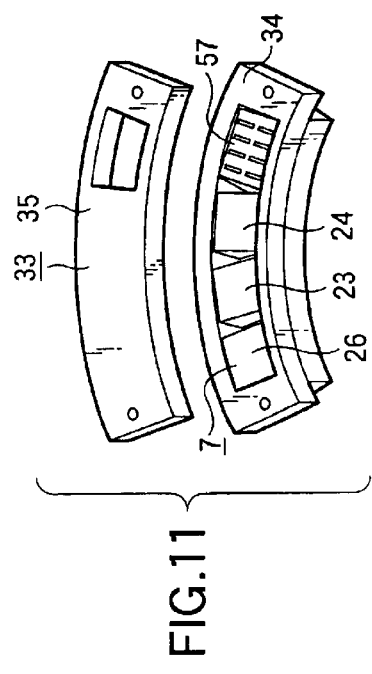
FIG. 11 is a substantially exploded perspective view of a sensor unit and a storage case used in the fifth embodiment.
Figure 12:
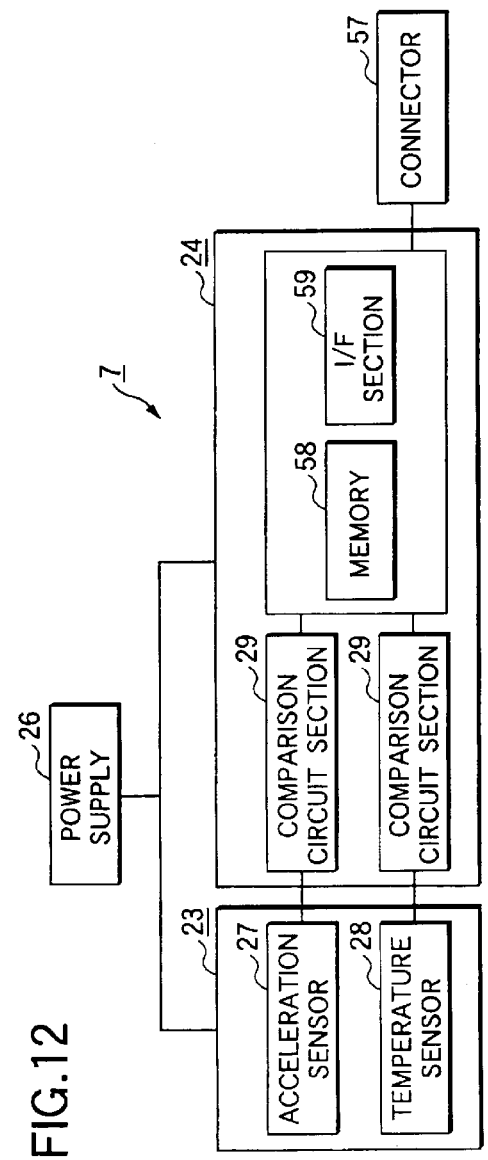
FIG. 12 is a block diagram of the sensor unit used in the fifth embodiment.

Next, FIGS. 10 to 12 show a fifth embodiment of a rolling bearing unit with a sensor according to the invention, which corresponds to a third aspect of the invention. In the present embodiment, differently from the previously described respective embodiments, the sensor unit 7 excludes the transmission control section 30 and transmitter device 25 (see FIGS. 4 and 6) which are used to transmit signals representing the detect values obtained by the detect part 23 as radio signals and, instead of them, includes a connector 57. And, a control part 24 forming part of the sensor unit 7 is composed of a pair of comparison circuit sections 29, 29, a memory 58 and an interface section 59. And, the sensor unit 7 is held on a portion of one (in FIG. 10, the right collar 15) of a pair of collars 15, 15 forming a four-row cylindrical roller bearing 6 and, while a hold cover 17 is butted against the above-mentioned one collar 15, the connecting portion of the connector 57 is disposed opposed to the axial-direction inner surface (in FIG. 10, the left side surface) of the hold cover 17. On the other hand, in such a position of a portion of the axial-direction inner surface of the hold cover 17 that is opposed to the connecting portion of the connector 57, there is disposed a plug 60 in such a manner that the connecting portion of the plug 60 is projected from the axial-direction inner surface of the hold cover 17. And, the plug 60 and connector 57 are connected to each other. Also, the plug 60 is connected to a connector 42, which is disposed on the axial-direction outer surface (in FIG. 10, the right side surface) of the hold cover 17, by a cable 41 inserted into the hold cover 17 in the axial direction thereof. And, to the connector 42, there can be connected a plug which is disposed on the end portion of a cable guided from an external input/output device (not shown). The external input/output device comprises an input part for recording data representing the items to be managed with respect to the four-row cylindrical roller bearing 6 into the above-mentioned memory 58, an output part for outputting the data taken out from the memory 58, and a control part.

Just after a rolling bearing unit with a sensor according to the present embodiment is assembled, a plug disposed on the end portion of a cable guided out from the external input/output device is connected to the connector 42 disposed on the axial-direction outer surface of the hold cover 17. And, in the vicinity of the place where the present rolling bearing unit with a sensor has been assembled, data representing the items to be managed with respect to the four-row cylindrical roller bearing 6 such as the identification number thereof, the use start time thereof, the assembling position thereof, the bearing accuracy thereof, and the numbers of the assembled housing 5 and backup roller 2 are input by an input portion which is formed in the external input/output device. And, the data are recorded into the memory 58 through the interface section 59. In case where such operation is completed, the plug disposed on the end portion of the cable of the external input/output device is removed from the connector 42 that is disposed on the hold cover 17.

And, when a rolling bearing unit with a sensor according to the present embodiment is in use, whenever a given time passes, the respective comparison circuit sections 29, 29 constituting the sensor unit 7 compare the detect values found by the detect part 23 with their respective given threshold values. And, data representing the thus compared results are recorded into the memory 58. When an operation manager tries to confirm whether an abnormal condition is present in the four-row cylindrical roller bearing 6 or not during use of the present rolling bearing unit, a plug disposed on the end portion of a cable of the external input/output device is connected to the connector 42 which is disposed on the hold cover 17. And, to the input portion of the external input/output device, there is input the effect that the items to be managed by the four-row cylindrical roller bearing 6 and the comparison results of the respective comparison circuit sections 29, 29 are to be output by the output portion of the external input/output device. In accordance with this input, the control portion of the external input/output device reads the data from the memory 58 through the interface section 59 and allows the output portion to output the thus read results.

In the thus structured rolling bearing unit with a sensor according to the present embodiment, in case where the operation manager makes a given input to the input portion of the external input/output device, the comparison results obtained by the comparison circuit sections 29, 29 can be output to the output portion of the external input/output device, thereby being able to confirm easily whether an abnormal condition is present in the four-row cylindrical roller bearing 6 or not. And, in the present embodiment, through the output portion of the external input/output device, the items to be managed with respect to the four-row cylindrical roller bearing 6 such as the identification number thereof and the use start time thereof can be confirmed easily. Also, in the present embodiment, since not only the identification number and use start time of the four-row cylindrical roller bearing 6 but also the comparison results obtained by the comparison circuit sections 29, 29 can be output to the output portion of the external input/output device, even in case where a plurality of rolling bearings is used in the rolling mill 1, it can be easily confirmed that the results output to the output portion are associated with the four-row cylindrical roller bearing 6. Further, in the present embodiment, using the sensor unit 7 and external input/output device, the data representing the items to be managed with respect to the four-row cylindrical roller bearing 6 can be recorded into the memory 58. Therefore, almost at the same time an operator assembles the four-row cylindrical roller bearing 6, the operator can record the present data in the vicinity of the place of such assembling operation, which not only can reduce mistakes in the data recording operation but also can facilitate the data recording operation.

Still further, in the present embodiment, since the end portion of the cable guided out from the external input/output device may be connected to the connector 42 disposed on the hold cover 17 only when the operation manager confirms presence or absence of the abnormal condition in the four-row cylindrical roller bearing 6, when in use, it is possible not only to prevent the above cable from interfering with the operation of the present rolling bearing unit but also to facilitate the operation of replacement of the backup roller 2 and four-row cylindrical roller bearing 6. Also, in the present embodiment, not only because the sensor unit 7 is held on a portion of the above-mentioned one collar 15 but also because the connector 57 of the sensor unit 7 is connected to the plug 60 disposed on the hold cover 17, the detection of the abnormal condition of the four-row cylindrical roller bearing 6 can be enhanced in accuracy and, at the same time, the replacement operation of the backup roller 2 and four-row cylindrical roller bearing 6 can be facilitated.

By the way, differently from the present embodiment, the plug disposed on the cable guided out from the external input/output device can also be kept connected to the connector 42 disposed on the hold cover 17 all the time when the rolling bearing unit is in use. In this case as well, when replacing the backup roller 2, simply by removing the hold cover 17 from the housing 5 and also by removing the plug disposed on the cable from the connector 42 disposed on the hole cover 17, the cable 44 can be prevented from interfering with such replacing operation, which makes it possible to facilitate the replacing operation.

The remaining structures and operations of the present embodiment are similar to the first embodiment previously discussed with reference to FIGS. 1 to 5. Therefore, equivalent parts are given the same designations and thus the duplicate description thereof is omitted here.

Figure 13:
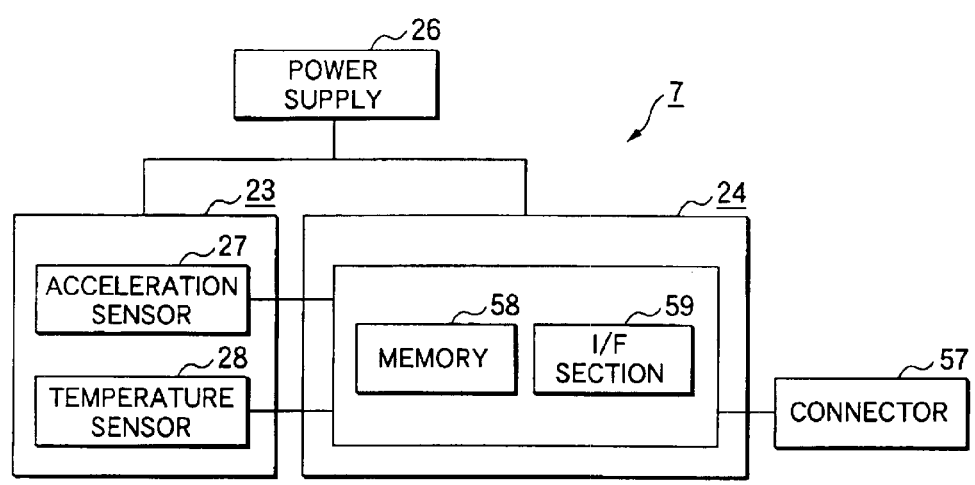
FIG. 13 is a block diagram of another embodiment of the sensor unit used in the fifth embodiment.

By the way, differently from the present embodiment, as shown in FIG. 13, the comparison circuit sections 29 (see FIG. 12) can be omitted from the control part 24 forming the sensor unit 7, and the control part 24 can be composed of only a memory 58 and an interface section 59. In this case, the control part 24, whenever a given time passes, records data, which represent the detect values of the temperatures and vibrations of a double-row cylindrical roller bearing 6 obtained by the detect part 23, into the memory 58. Thus, in this structure, the data representing the detect values, as they are, are output to an output portion formed in an external input/output device. Therefore, there can also be employed the following structure: that is, in the present external input/output device, there is formed a comparison circuit section which compares the detect values of the temperatures and vibrations with their respective given threshold values, and the comparison results obtained by this comparison circuit section can be output to the output portion of the external input/output device.

Figure 14:
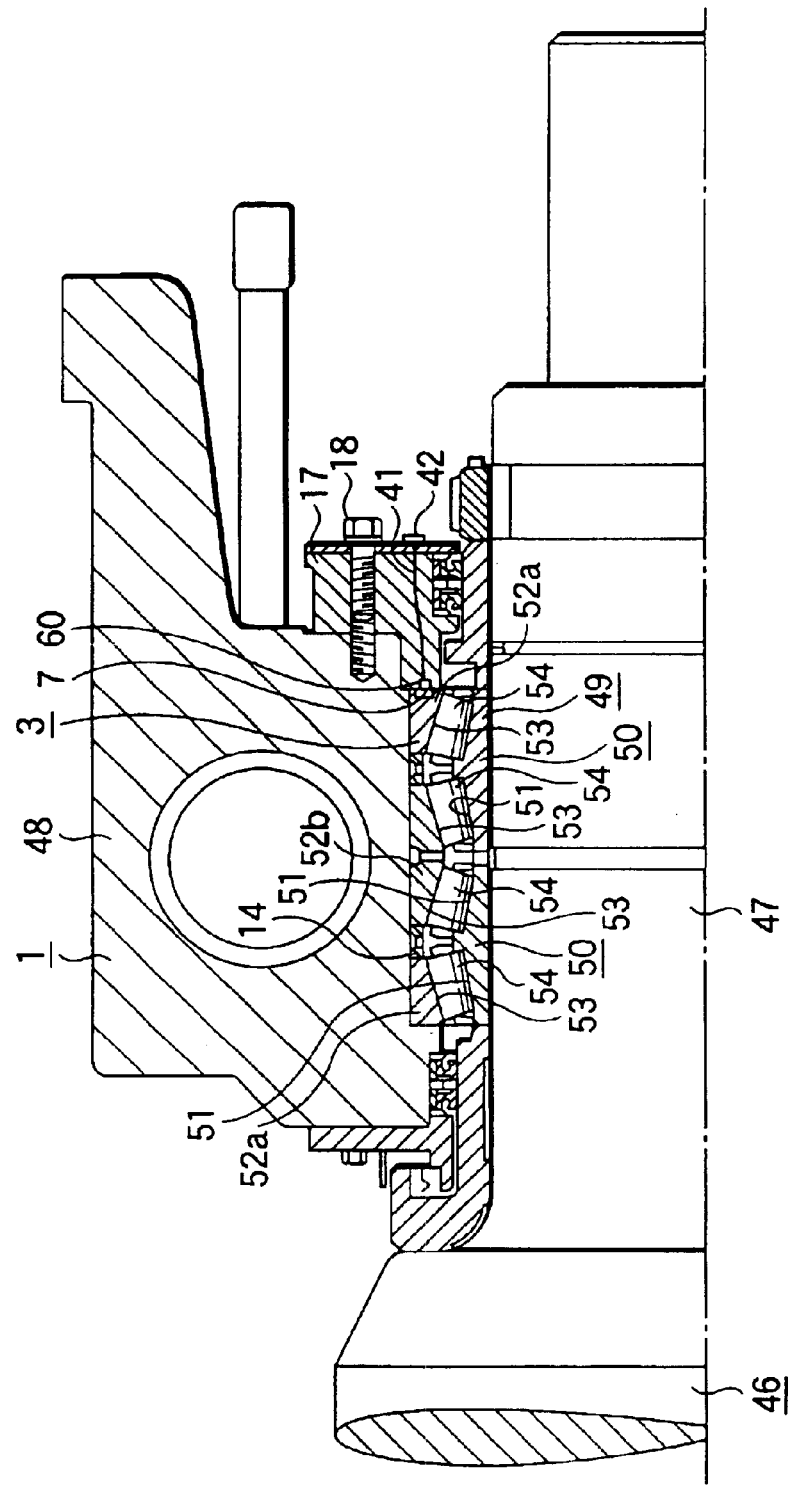
FIG. 14 is a section view of a half section of a sixth embodiment of a rolling bearing unit with a sensor according to the invention.

Next, FIG. 14 shows a sixth embodiment of a rolling bearing unit with a sensor according to the invention, which also corresponds to the third aspect of the invention. A rolling bearing unit with a sensor 3 according to the present embodiment has a structure which is a combination of the structure according to the fifth embodiment shown in FIGS. 10 to 12 and the structure according to the third embodiment shown in FIG. 8. That is, in the present embodiment, instead of the four-row cylindrical roller bearing 6 used in the fifth embodiment shown in FIGS. 10 to 12, there is used a four-row conical roller bearing 49 and, at the same time, a sensor unit 7 is held on the axial-direction outer end portion (in FIG. 14, the right end portion) of an outer ring 52a disposed on the axial-direction outer end side (in FIG. 14, on the right end side) of the present four-row conical roller bearing 49.

The remaining structures and operations of the sixth embodiment are similar to those of the fifth embodiment shown in FIGS. 10 to 12 or those of the third embodiment shown in FIG. 8. Therefore, equivalent parts thereof are given the same designations and thus the duplicate description thereof is omitted here.

Figure 15:
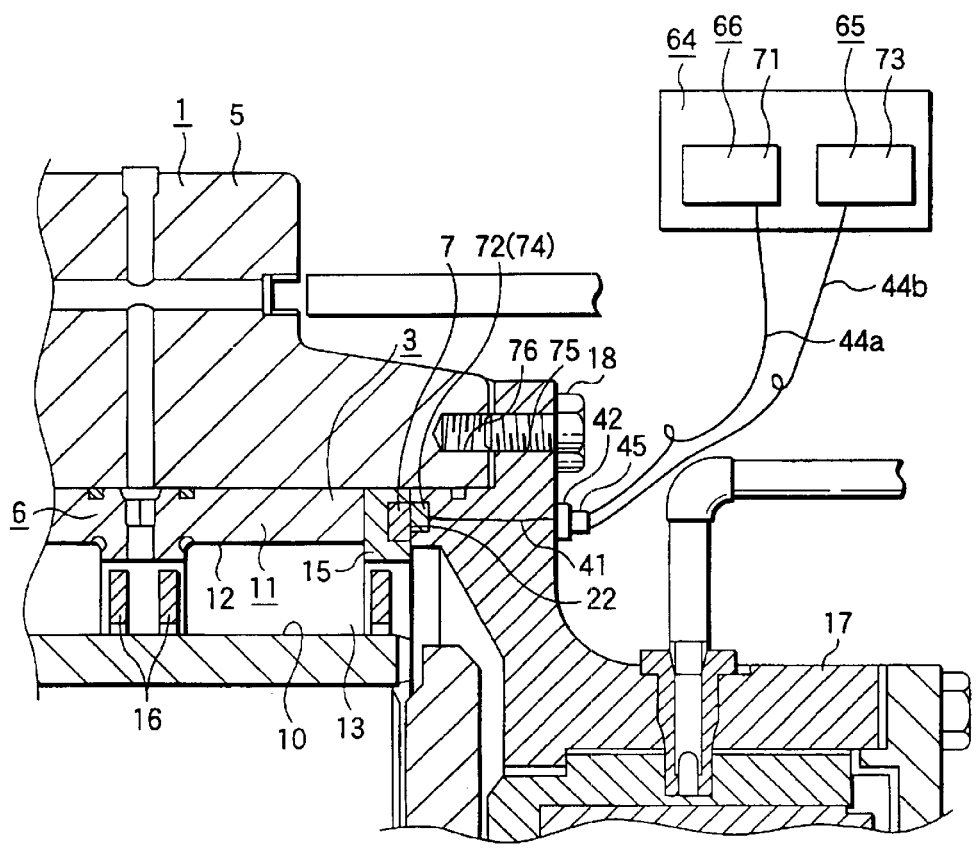
FIG. 15 is a section view of a half section of a seventh embodiment of a rolling bearing unit with a sensor according to the invention, corresponding to the A portion shown in FIG. 1.
Figure 16:
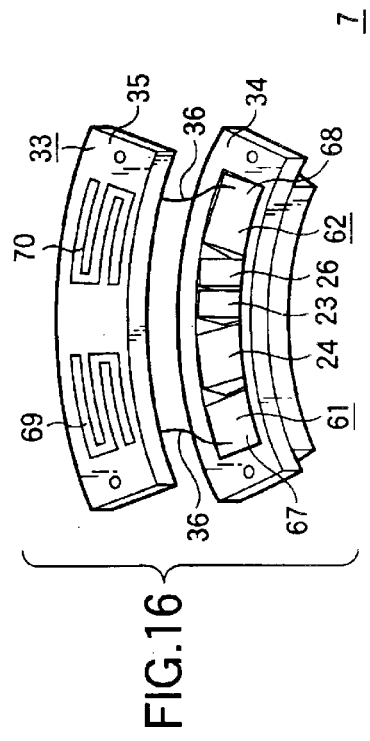
FIG. 16 is a substantially exploded perspective view of a sensor unit and a storage case used in the seventh embodiment.
Figure 17:
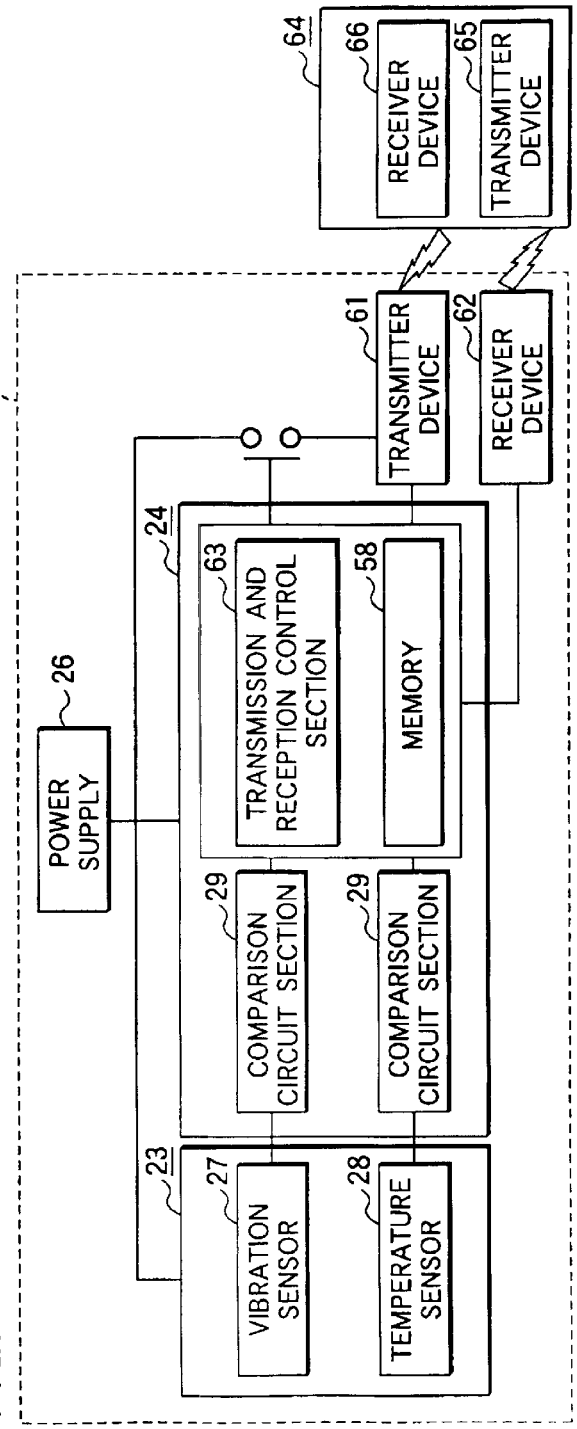
FIG. 17 is a block diagram of the sensor unit used in the seventh embodiment; and, FIG. 18 is a block diagram of another embodiment of the sensor unit used in the seventh embodiment.

Next, FIGS. 15 to 17 show a seventh embodiment of a rolling bearing unit with a sensor according to the invention, which corresponds to a fourth aspect of the invention. A rolling bearing unit with a sensor 3 according to the present embodiment includes a four-row cylindrical roller bearing 6, a sensor unit 7 and an external input/output device 64. And, the four-row cylindrical roller bearing 6 includes a pair of collars 15 and, in a portion of one collar 15 of them which is shown in FIG. 15, there is formed a groove portion 22; and, the sensor unit 7 is supported in this groove portion 22. The sensor unit 7, as shown in FIGS. 16 and 17, comprises a detect part 23, a control part 24, a first transmitter device 61 and a first receiver apparatus 62, and a power supply 26 for driving or operating these respective parts 23, 24, 61 and 62. Also, the control part 24 includes a pair of comparison circuit sections 29, 29, a memory 58, and a transmission & reception control section 63. Of these composing elements, the respective comparison circuit sections 29, 29, whenever a given time passes after the power supply 26 is turned on, compare detect values represented by output signals taken out from a vibration sensor 27 or a temperature sensor 28 forming the detect part 23 with their respective preset given threshold values. Also, the memory 58 records therein data representing the items to be managed with respect to the four-row cylindrical roller bearing 6 such as the identification number thereof, the use start time thereof, the assembling position thereof, the bearing accuracy thereof, and the numbers of the assembled housing 5 and backup roller 2. Also, the transmission & reception control section 63 has the following function: that is, it allows a second transmitter device 65 forming the external input/output device 64 to transmit radio signals to the first receiver device 62, thereby allowing the first transmitter device 61 to transmit part or all of the data recorded in the memory 58 as radio signals.

Also, in the present embodiment, the detect part 23, control part 24, power supply 26, and the main body portions 67, 68 of the first transmitter device 61 and first receiver device 62, which respectively constitute the sensor unit 7, are supported in the interior of a storage portion 34 which constitutes a storage case 33. And, on the side surface of a cover portion 35 which constitutes the storage case 33, there are disposed a transmission antenna 69 and a receive antenna 70 which respectively constitute the first transmitter device 61 and first receiver device 62. Also, the storage portion 34 and cover portion 35 are connected to each other by screws 37 (see FIG. 2). The sensor unit 7, which is supported on the storage case 33 in this manner, is held in the groove portion 22 formed in a portion of the above-mentioned one collar 15. In the case of the present embodiment, the present one collar 15 corresponds to an end portion member set forth in the fourth aspect of the invention.

On the other hand, the external input/output device 64 comprises a second transmitter device 65 and a second receiver device 66, a control portion, an input portion, and an output portion (not shown) such as a display portion. Of these composing elements, the second transmitter device 65 includes a main body portion 71 and a transmission antenna 72 connected to the main body portion 71. Also, the second receiver device 66 includes a main body portion 73 and a receive antenna 74 connected to the main body portion 73. And, in such a position in the diameter-direction middle portion of the axial-direction inner surface (in FIG. 15, the left side surface) of a hold cover 17 fixed to the axial-direction outer end portion (in FIG. 15, the right end portion) of the housing 5 that is almost opposed to the transmission antenna portion 69 of the sensor unit 7, there is disposed a receive antenna 74 which constitutes the second receiver device 66. Also, similarly, in such a position that is disposed almost opposed to the receive antenna 70 of the sensor unit 7, there is disposed a transmission antenna 72 which constitutes the second transmitter device 65. And, a cable 41 with one end thereof connected to these receive and transmission antennas 72, 74 is inserted into the hold cover 17 in the axial direction thereof, whereas the other end of the cable 41 is connected to a connector 42 disposed on the axial-direction outer surface (in FIG. 1, the right side surface) of the hold cover 17. And, to the connector 42, there is connected a plug 45 disposed on the other ends of cables 44a, 44b the one-side ends of which are respectively connected to the main body portions 71, 73 of the second transmitter device 65 and second receiver device 66.

The second receiver device 66 is able to receive radio signals transmitted from the first transmitter device 61 forming the sensor unit 7 through the receive antenna 74. Also, the control portion forming the external input/output device 64 has the following function: that is, when the second receiver device 66 receives a radio signal, it allows the output portion to output data represented by the present radio signal and, at the same time, in accordance with a signal transmitted in response to an input action made into the input portion, it allows the second transmitter device 65 to transmit a radio signal. By the way, referring to the transmission and receive antenna portions 69, 70 of the sensor unit 7 as well as the transmission and receive antennas 72, 74 of the second transmitter and receiver devices 65, 66, as in the present embodiment, they can be disposed separately, or, alternatively, a single antenna can be used in common.

Just after a rolling bearing unit with a sensor according to the present embodiment is assembled, data representing the items to be managed with respect to the four-row cylindrical roller bearing 6 assembled such as the identification number thereof, the use start time thereof, the assembling position thereof, and the bearing accuracy as well as the numbers of the housing 5 and backup roller 2 assembled to the four-row cylindrical roller bearing 6 are input into the input portion of the external input/output device 64. Signals representing the data input to the present input portion are transmitted as radio signals by the second transmitter device 65. And, the first receiver device 62 of the sensor unit 7 receives these radio signals, and data represented by the thus received radio signals are recorded into the memory 58.

And, when a rolling bearing unit with a sensor according to the present embodiment is in use, whenever a given time passes, the respective comparison circuit sections 29, 29 disposed in the sensor unit 7 compare the detect values found by the vibration sensor 27 or temperature sensor 28 with their respective given threshold values. And, data representing the thus compared result are recorded in the memory 58. When an operation manager tries to confirm whether an abnormal condition is present in the four-row cylindrical roller bearing 6 or not during use of the present rolling bearing unit, the effect to confirm presence or absence of the abnormal condition is input into the input portion of the external input/output device 64. A signal based on such input is transmitted as a radio signal by the second transmitter device 65 and is received by the first receiver device 62. And, based on this signal reception, not only the data, which are recorded in the memory 58 and represent the comparison results obtained by the comparison circuit sections 29, 29, but also the data representing the items to be managed with respect to the four-row cylindrical roller bearing 6 are transmitted as radio signals by the first transmitter device 61. The control portion of the external input/output device 64, when the second receiver device 66 of the external input/output device 64 receives these radio signals, allows the output portion of the external input/output device 64 to output the present data therefrom.

In the case of the above-structured rolling bearing unit with a sensor according to the present embodiment, in case where an operation manager executes an input operation using the external input/output device 64, the comparison results obtained by the comparison circuit sections 29, 29 forming the sensor unit 7 can be output by the output portion of the external input/output device 64, thereby being able to confirm easily whether any abnormal condition is present in the four-row cylindrical roller bearing 6 or not. Also, the items to be managed with respect to the four-row cylindrical roller bearing 6 such as the identification number of the four-row cylindrical roller bearing 6 can be confirmed easily through the output portion of the external input/output device 64. And, in the present embodiment, since not only the identification number of the four-row cylindrical roller bearing 6 but also the comparison results obtained by the comparison circuit sections 29, 29 can be output to the output portion of the external input/output device 64, even in case where a plurality of rolling bearings are used in the rolling mill 1, it is possible to confirm easily that the results output to the output portion are associated with the four-row cylindrical roller bearing 6. Further, the data representing the items to be managed with respect to the four-row cylindrical roller bearing 6 can be recorded into the memory 58 using the external input/output device 64. Thanks to this, almost at the same time when the four-row cylindrical roller bearing 6 is assembled, the above data can be recorded in the vicinity of the place for assembling of the present four-row cylindrical roller bearing 6, which makes it possible not only to reduce mistakes in the data recording operation but also to facilitate the data recording operation.

Also, in the present embodiment, when replacing the backup roller 2 and four-row cylindrical roller bearing 6, in case where the hold cover 17 is removed from the housing 5 and also the plug disposed on the cable is removed from the connector 42 disposed on the hold cover, the cable 44 can be prevented from interfering with the above replacing operation, thereby being able to facilitate the replacing operation. By the way, in the present embodiment as well, similarly to the fifth and sixth embodiments shown in FIGS. 10 to 14, there can also be employed a structure in which, only when the operation manager confirms the presence or absence of an abnormal condition in the four-row cylindrical roller bearing 6, the plug disposed on the end portion of the cable guided out from the external input/output device 64 can be connected to the connector 42 disposed on the hold cover 17.

Further, in the present embodiment as well, since the sensor unit 7 including the detect part 23 is held on one of the two collars 15 forming the four-row cylindrical roller bearing 6, when compared with a structure in which a temperature sensor and a vibration sensor are disposed on a portion of the housing 5, not only the detect values themselves of the temperatures and vibrations of the four-row cylindrical roller bearing 6 but also the detection of the abnormal condition of the four-row cylindrical roller bearing 6 based on these detect values can be enhanced in accuracy. Also, in the present embodiment, in the sensor unit 7, there is disposed the first transmitter device 61 which is able to transmit signals representing the comparison results between the detect values of the temperatures and vibrations and their respective given threshold values as radio signals. At the same time, in a portion of the hold cover 17 which is a separate member from the above-mentioned one collar 15 supporting the sensor unit 7, there is disposed the second transmitter device for receiving the present radio signals. Thanks to this, there is eliminated the need to connect the external input/output device 64 for notifying the operation manager of the presence or absence of an abnormal condition in the four-row cylindrical roller bearing 6 to the sensor unit 7 using wires such as a harness. For this reason, the replacing operation of the backup roller 2 and four-row cylindrical roller bearing 6 can be facilitated further.

The remaining structures and operations of the seventh embodiment are similar to those of the first embodiment shown in FIGS. 1 to 5. Therefore, equivalent parts thereof are given the same designations and thus the duplicate description thereof is omitted here.

By the way, differently from the present embodiment, the sensor unit 7 can also employ another structure in which, as shown in FIG. 18, the comparison circuit sections 29 (see FIG. 17) are omitted from the sensor unit 7. In this structure, whenever a given time passes, data representing the detect values of the temperatures and vibrations of the four-row cylindrical roller bearing 6 obtained by the detect part 23 are recorded into the memory 58 which forms part of the sensor unit 7. To attain this, in this case, the data representing the detect values, as they are (that is, while they are not compared with their respective threshold values), are output to the output portion of the external input/output device 64. Therefore, in the external input/output device 64, there may be disposed a comparison circuit section for comparing the above-mentioned detect values with their respective threshold values, so that the comparison results obtained by the comparison circuit can be output by the output portion of the external input/output device 64. Also, although not shown, in a rolling bearing unit with a sensor according to the invention, instead of the four-row cylindrical roller bearing 6, there can be used a four-row conical roller bearing.

Also, differently from the present embodiment, in the case of a rolling bearing unit with a sensor according to the first and fourth aspects of the invention, on the axial-direction end portion of the retainer for holding a plurality of rolling elements such as cylindrical rollers or conical rollers, there can be disposed a sensor unit. Further, in the case of a rolling bearing unit with a sensor according to the first and fourth aspects of the invention, the radio signals are not limited to signals that can be transmitted and received as electric waves. That is, the radio signals may also be optical signals, ultrasonic signals, or magnetic signals, provided that they can be transmitted and received by radio between a transmitter device and a receiver device. Also, in the above-mentioned respective embodiments, description has been given of a structure in which the rolling bearing consists of a four-row roller bearing; however, according to the invention, the rolling bearing is not limited to this structure. For example, the rolling bearing may also consist of a single- or double-row rolling bearing, or a multi-row rolling bearing such as a three- or more-row (other than four-row) rolling bearing.

With use of a rolling bearing unit with a sensor according to the invention, since it is structured and operates in the above-mentioned manner, not only the detection of the abnormal condition of the rotation support portion of various industrial machines can be enhanced in accuracy but also the replacing operation of the parts to be disposed on the rotation support portions of the various industrial machines can be facilitated. Further, mistakes in recording the data representing the items to be managed with respect to the rolling bearing unit can be reduced and, at the same time, such data recording operation can be facilitated.

What is claimed is:

1. A rolling bearing unit with a sensor, comprising:
   an outer ring and an inner ring, one of the outer and inner rings being a rotary ring and the other being a fixed ring, and the outer and inner rings being rotatable with respect to each other;
   a plurality of rolling elements rollably interposed between an outer raceway formed in an inner peripheral surface of the outer ring and an inner raceway formed in an outer peripheral surface of the inner ring; and
   a sensor unit for detecting at least one of temperature and vibration of a rolling bearing including the rolling elements,
   wherein:
   the sensor unit is disposed on an axial-direction end portion of the fixed ring
   the sensor unit includes a detect part, a control part, a transmitter device and a power supply for operating the detect part, the control part and the transmitter device;
   at least a part of a receiver apparatus for receiving a radio signal transmitted from the transmitter device is provided in a member that is separated from a member supporting the sensor; and the part of the receiver apparatus is disposed at a position substantially opposing the sensor unit.

2. The rolling bearing unit with a sensor as claimed in claim 1,
wherein the power unit, the detect part, the control part and the transmitter device are supported inside a storage case made of a synthetic resin.

3. The rolling bearing unit with a sensor as set forth in claim 1, wherein, the sensor unit comprises: a detect part for detecting at least one of the temperatures and the vibrations; a memory for recording data representing output signals taken out from the detect part or signals obtained after the output signals are processed as well as the items to be managed with respect to the rolling bearing; and, a connector to be connected to an external input/output device, the external input/output device including an input for recording the data representing the items to be managed with respect to the rolling bearing into the memory and an output portion for outputting data taken out from the memory.

4. A multi-row rolling bearing unit, comprising the sensor unit as set forth in claim 3.

5. A multi-row rolling bearing unit for use in a roller neck supporting the rotation of a rolling roller disposed in a rolling mill in metal rolling facilities, comprising the sensor unit as set forth in claim 3.

6. A multi-row rolling bearing unit for use in a roller neck supporting the rotation of a rolling roller disposed in a rolling mill in paper manufacturing machine facilities, comprising the sensor unit as set forth in claim 3.

7. A multi-row rolling bearing unit, comprising the sensor unit as set forth in claim 1.

8. A multi-row rolling bearing unit for use in a roller neck supporting the rotation of a rolling roller disposed in a rolling mill in metal rolling facilities, comprising the sensor unit as set forth in claim 1.

9. A multi-row rolling bearing unit for use in a roller neck supporting the rotation of a rolling roller disposed in a rolling mill in paper manufacturing machine facilities, comprising the sensor unit as set forth in claim 1.

10. The rolling bearing unit with a sensor as set forth in claim 1, wherein, the sensor unit comprises: a detect part for detecting at least one of the temperatures and the vibrations; a memory for recording data representing output signals taken out from the detect part or signals obtained after process of the output signals as well as the items to be managed with respect to the rolling bearing; a first transmitter device for transmitting signals representing the data as radio signals; and, a first receiver device, and a portion of a member disposed separately from a member supporting the sensor unit includes at least part of a second receiver device for receiving the radio signals transmitted by the first transmitter device, and part of a second transmitter device for transmitting the data representing the items to be managed with respect to the rolling bearing as radio signals; and, the first receiver device receives the radio signals transmitted by the second transmitter device.

11. A multi-row rolling bearing unit, comprising the sensor unit as set forth in claim 10.

12. A multi-row rolling bearing unit for use in a roller neck supporting the rotation of a rolling roller disposed in a rolling mill in metal rolling facilities, comprising the sensor unit as set forth in claim 10.

13. A multi-row rolling bearing unit for use in a roller neck supporting the rotation of a rolling roller disposed in a rolling mill in paper manufacturing machine facilities, comprising the sensor unit as set forth in claim 10.

14. The rolling bearing unit with a sensor as claimed in claim 1,
wherein the control part comprises a comparison circuit unit that compares a detect value represented by an output signal taken out from a sensor in the detect part, with a preset given threshold value, and a transmission control section that allows the transmitter device to transmit a result of comparison from the comparison circuit unit.

15. The rolling bearing unit with a sensor as claimed in claim 14,
wherein the comparison circuit unit compares the detect value with the given threshold value whenever a given time passes after the power supply is turned on.

16. The rolling bearing unit with a sensor as claimed in claim 15,
wherein the receiver apparatus includes an output part that outputs the result of comparison from the comparison circuit unit which is represented by a radio signal received by a receive antenna.

17. The rolling bearing unit with a sensor as claimed in claim 14,
wherein the receiver apparatus includes an output part that outputs the result of comparison from the comparison circuit unit which is represented by a radio signal received by a receive antenna.

18. The rolling bearing unit with a sensor as claimed in claim 1,
wherein the control part includes a transmission control unit that transmits an output signal of a detected value from a sensor as a radio signal; and the receiver apparatus comprises an output apparatus comprising a comparison circuit that compares the detect value with a given threshold value and an output part that outputs a result of comparison.

19. The rolling bearing unit with a sensor as claimed in claim 18,
wherein the control part allows the output signal of the detected value from the sensor to be transmitted as the radio signal whenever a given time passes.

20. A rolling bearing unit with a sensor, comprising:
an outer ring and an inner ring, one of the outer and inner rings being a rotary ring and the other being a fixed ring, and the outer and inner rings being rotatable with respect to each other;

a plurality of rolling elements rollably interposed between an outer raceway formed in an inner peripheral surface of the outer ring and an inner raceway formed in an outer peripheral surface of the inner ring; and a sensor unit for detecting at least one of temperature and vibration of a rolling bearing including the rolling elements, wherein:

the sensor unit is disposed on a portion of an end portion member disposed so as to be superimposed on the axial-direction end face of the fixed ring;

the sensor unit includes a detect part, a control part, a transmitter device and a power supply for operating the detect part, the control part and the transmitter device;

at least a part of a receiver apparatus for receiving a radio signal transmitted from the transmitter device is provided in a member that is separated from a member supporting the sensor; and the part of the receiver is disposed at a position substantially opposing the sensor unit.

21. A multi-row rolling bearing unit for use in a roller neck supporting the rotation of a rolling roller disposed in a rolling mill in metal rolling facilities, comprising the sensor unit as set forth in claim 20.

22. The rolling bearing unit with a sensor as claimed in claim 20,
wherein the control part comprises a comparison circuit unit that compares a detect value represented by an output signal taken out from a sensor in the detect part, with a preset given threshold value, and a transmission control section that allows the transmitter device to transmit a result of comparison from the comparison circuit unit.

23. The rolling bearing unit with a sensor as claimed in claim 22,
wherein the comparison circuit unit compares the detect value with the given threshold value whenever a given time passes after the power supply is turned on.

24. The rolling bearing unit with a sensor as claimed in claim 23,
wherein the receiver apparatus includes an output part that outputs the result of comparison from the comparison circuit unit which is represented by a radio signal received by a receive antenna.

25. The rolling bearing unit with a sensor as claimed in claim 22,
wherein the receiver apparatus includes an output part that outputs the result of comparison from the comparison circuit unit which is represented by a radio signal received by a receive antenna.

26. The rolling bearing unit with a sensor as claimed in claim 20,
wherein the control part includes a transmission control unit that transmits an output signal of a detected value from a sensor as a radio signal; and
the receiver apparatus comprises an output apparatus comprising a comparison circuit that compares the detect value with a given threshold value and an output part that outputs a result of comparison.

27. The rolling bearing unit with a sensor as claimed in claim 26,
wherein the control part allows the output signal of the detected value from the sensor to be transmitted as the radio signal whenever a given time passes.

28. The rolling bearing unit with a sensor as claimed in claim 20,
wherein the power unit, the detect part, the control part and the transmitter device are supported inside a storage case made of a synthetic resin.

29. A multi-row rolling bearing unit, comprising the sensor unit as set forth in claim 20.

30. A multi-row rolling bearing unit for use in a roller neck supporting the rotation of a rolling roller disposed in a rolling mill in paper manufacturing machine facilities, comprising the sensor unit as set forth in claim 20.

31. A rolling bearing unit with a sensor, comprising:
an outer ring and an inner ring, one of the outer and inner rings being a rotary ring and the other being a fixed ring, and the outer and inner rings being rotatable with respect to each other;
a plurality of rolling elements rollably interposed between an outer raceway formed in an inner peripheral surface of the outer ring and an inner raceway formed in an outer peripheral surface of the inner ring; and
a sensor unit for detecting at least one of temperature and vibration of a rolling bearing including the rolling elements,
wherein:
the sensor unit is disposed on an axial-direction end portion of a retainer for holding at least part of the rolling elements;
the sensor unit includes a detect part, a control part, a transmitter device and a power supply for operating the detect part, the control part and the transmitter device;
at least a part of a receiver apparatus for receiving a radio signal transmitted from the transmitter device is provided in a member that is separated from a member supporting the sensor; and
the part of the receiver apparatus is disposed at a position substantially opposing the sensor unit.

32. A multi-row rolling bearing unit for use in a roller neck supporting the rotation of a rolling roller disposed in a rolling mill in paper manufacturing machine facilities, comprising the sensor unit as set forth in claim 31.

33. The rolling bearing unit with a sensor as claimed in claim 31,
wherein the control part comprises a comparison circuit unit that compares a detect value represented by an output signal taken out from a sensor in the detect part, with a preset given threshold value, and a transmission control section that allows the transmitter device to transmit a result of comparison from the comparison circuit unit.

34. The rolling bearing unit with a sensor as claimed in claim 33,
wherein the comparison circuit unit compares the detect value with the given threshold value whenever a given time passes after the power supply is turned on.

35. The rolling bearing unit with a sensor as claimed in claim 34,
wherein the receiver apparatus includes an output part that outputs the result of comparison from the comparison circuit unit which is represented by a radio signal received by a receive antenna.

36. The rolling bearing unit with a sensor as claimed in claim 33,
wherein the receiver apparatus includes an output part that outputs the result of comparison from the comparison circuit unit which is represented by a radio signal received by a receive antenna.

37. The rolling bearing unit with a sensor as claimed in claim 31,
wherein the control part includes a transmission control unit that transmits an output signal of a detected value from a sensor as a radio signal; and
the receiver apparatus comprises an output apparatus comprising a comparison circuit that compares the detect value with a given threshold value and an output part that outputs a result of comparison.

38. The rolling bearing unit with a sensor as claimed in claim 37,
wherein the control part allows the output signal of the detected value from the sensor to be transmitted as the radio signal whenever a given time passes.

39. The rolling bearing unit with a sensor as claimed in claim 31,
wherein the power unit, the detect part, the control part and the transmitter device are supported inside a storage case made of a synthetic resin.

40. A multi-row rolling bearing unit, comprising the sensor unit as set forth in claim 31.

41. A multi-row rolling bearing unit for use in a roller neck supporting the rotation of a rolling roller disposed in a rolling mill in metal rolling facilities, comprising the sensor unit as set forth in claim 31.

* * * * *